United States Patent
Smith et al.

(10) Patent No.: US 6,198,931 B1
(45) Date of Patent: Mar. 6, 2001

(54) METHOD FOR PRIORITIZING A COMMUNICATION IN A WIRELESS COMMUNICATION SYSTEM

(75) Inventors: Dwight Randall Smith, Grapevine; Thomas Casey Hill, Trophy Club; Slim Souissi, Fort Worth, all of TX (US); Carl Bernard Olson, San Carlos, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/362,589

(22) Filed: Jul. 28, 1999

(51) Int. Cl.[7] .................................................. H04Q 7/20
(52) U.S. Cl. ........................ 455/445; 455/456; 455/466; 455/527
(58) Field of Search ...................... 455/445, 456, 455/414, 457, 466, 458, 440, 441, 512, 527, 404

(56) References Cited

U.S. PATENT DOCUMENTS

| | | | |
|---|---|---|---|
| 4,788,543 | * | 11/1988 | Rubin ............................. 340/825.44 |
| 5,179,374 | * | 1/1993 | Winger ................................. 455/440 |
| 5,442,805 | * | 8/1995 | Sagers et al. ....................... 455/456 |
| 5,577,029 | * | 11/1996 | Lu et al. .............................. 455/445 |
| 5,592,154 | * | 1/1997 | Lin et al. ........................... 455/38.2 |
| 5,600,704 | * | 2/1997 | Ahlberg et al. ..................... 455/445 |
| 5,623,535 | * | 4/1997 | Leung et al. ........................ 455/444 |
| 5,666,661 | * | 9/1997 | Grube et al. ........................ 455/509 |
| 5,678,179 | * | 10/1997 | Turcotte et al. ..................... 455/466 |
| 5,778,304 | * | 7/1998 | Grube et al. ......................... 455/422 |
| 5,930,239 | * | 7/1999 | Turcotte .............................. 455/466 |
| 5,930,700 | * | 7/1999 | Pepper et al. ....................... 455/414 |
| 5,946,611 | * | 8/1999 | Dennison et al. ................... 455/445 |
| 5,966,658 | * | 10/1999 | Kennedy, III et al. ............. 455/445 |
| 6,014,556 | * | 1/2000 | Bhatia et al. ....................... 455/404 |
| 6,038,451 | * | 3/2000 | Syed et al. .......................... 455/445 |
| 6,073,013 | * | 6/2000 | Agre et al. .......................... 455/446 |
| 6,091,959 | * | 7/2000 | Souissi et al. ...................... 455/456 |
| 6,108,532 | * | 8/2000 | Matsuda et al. .................... 455/441 |
| 6,119,014 | * | 9/2000 | Alperovich et al. ................ 455/466 |

FOREIGN PATENT DOCUMENTS

WO 95/12933
  A1  *  5/1995  (WO) .............................. H04J/3/16
WO 97/41654
  A1  *  11/1997  (WO) .............................. H04H/1/00

* cited by examiner

Primary Examiner—Edward F. Urban
Assistant Examiner—Rafael Perez-Gutierrez
(74) Attorney, Agent, or Firm—R. Louis Breeden (57) ABSTRACT

A wireless communication system receives (402) a communication specifying a portable subscriber unit (122) for which the communication is intended, and further indicating an originator location at which an originator of the communication is positioned. The system determines (404) a recipient location at which the portable subscriber unit is positioned. The system then calculates (406) a distance between the originator location and the recipient location, and routes (412) the communication to the portable subscriber unit when the distance meets a distance criterion.

11 Claims, 7 Drawing Sheets

METHOD FOR PRIORITIZING A COMMUNICATION IN A WIRELESS COMMUNICATION SYSTEM

FIELD OF THE INVENTION

This invention relates in general to wireless communication systems, and more specifically to a method for prioritizing a communication in a wireless communication system.

BACKGROUND OF THE INVENTION

Call prioritization based upon location is becoming increasingly important. For example, time is money for many people, and dealing with phone calls or other messages takes time. Being able to route calls to alternate services, e.g., voice mail, on various criteria is becoming important to help control the effort expended on low-value communication.

Salespersons who cover large territories, business executives, and other mobile professionals may have preferences about callers with whom they wish to spend time that are dependent on where the mobile professional and the caller are located. Urgency of a mobile-generated call may be affected by the location of the caller. A mobile subscriber may not want to receive any low-priority calls while driving at high speed. Prior art wireless communication systems have not provided adequate solutions to such prioritization problems.

Thus, what is needed is a method for prioritizing a communication in a wireless communication system. Preferably, the method will allow prioritization based upon the relative locations of the caller and the intended recipient, further based upon the location of a calling portable unit, and further based upon the speed at which an intended portable recipient is moving.

SUMMARY OF THE INVENTION

An aspect of the present invention is a method for prioritizing a communication in a wireless communication system serving a plurality of portable subscriber units. The method comprises the steps of receiving the communication, which specifies a first one of the plurality of portable subscriber units for which the communication is intended, and further indicates an originator location at which an originator of the communication is positioned; and determining a recipient location at which the first one of the plurality of portable subscriber units is positioned. The method further comprises the steps of calculating a distance between the originator location and the recipient location, and routing the communication to the first one of the plurality of portable subscriber units when the distance meets a distance criterion.

Another aspect of the present invention is a method for prioritizing a communication in a wireless communication system serving a plurality of portable subscriber units. The method comprises the steps of receiving the communication from one of the plurality of portable subscriber units, and determining a location at which the one of the plurality of portable subscriber units is positioned. The method further comprises the steps of assigning a priority to the communication, the priority based upon the location; and processing the communication in accordance with the priority.

Another aspect of the present invention is a method for prioritizing a communication in a wireless communication system serving a plurality of portable subscriber units. The method comprises the steps of receiving the communication, which specifies one of the plurality of portable subscriber units for which the communication is intended; and computing a speed at which the one of the plurality of portable subscriber units is moving. The method further comprises the steps of comparing the speed with a speed threshold, and routing the communication to the one of the plurality of portable subscriber units when the speed does not exceed the speed threshold.

DETAILED DESCRIPTION OF THE DRAWINGS

Figure 1:
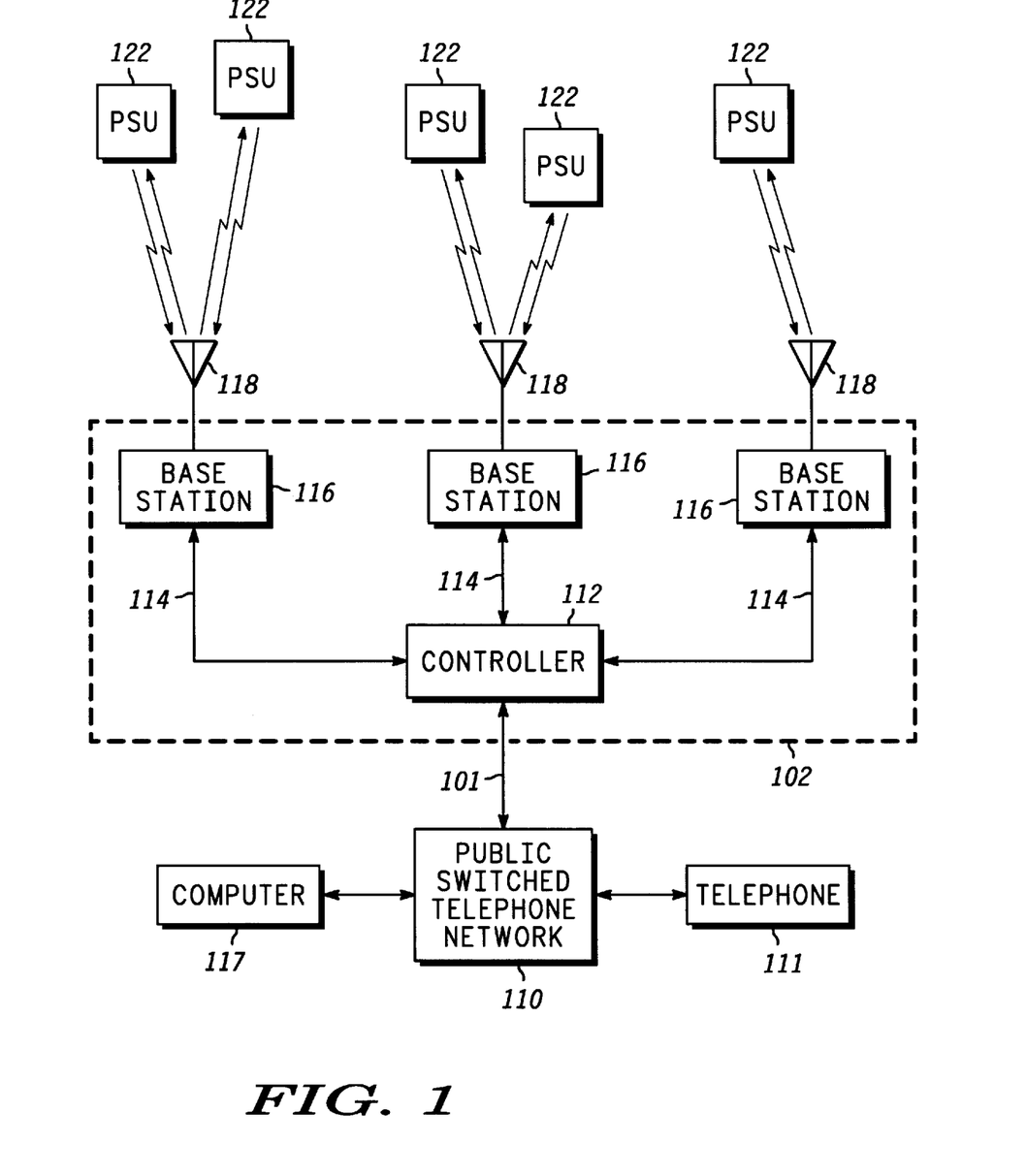
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention, The hardware of the base stations 116 is preferably a combination of the RF-Orchestra!™ transmitter and the RF-Audience!™ receiver manufactured by Motorola, Inc. The portable subscriber units 122 are preferably similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information. It will be appreciated that, alternatively, another wireless communication technology, e.g., infrared technology, can be used to communicate between the base stations 116 and the portable subscriber units 122.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications and information utilized by the wireless communication system. In that mode, the computer 117 preferably is coupled directly to the controller 112 without going through the PSTN.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that the present invention also is applicable to many different types of wireless communication systems, including cellular telephone systems, trunked dispatch systems, and voice and data messaging systems, to name a few.

Figure 2:
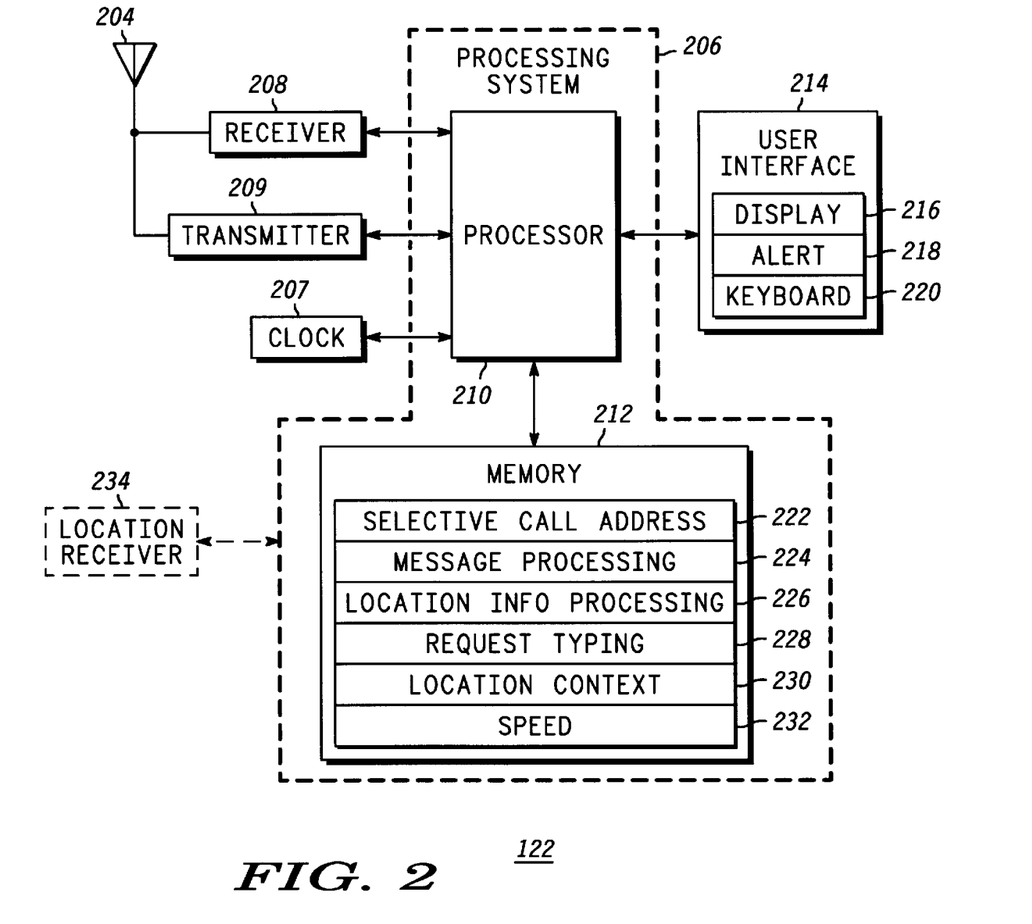
FIG. 2 is an electrical block diagram of an exemplary portable subscriber unit in accordance with the present invention.

FIG. 2 is an electrical block diagram of an exemplary portable subscriber unit 122 in accordance with the present invention, The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional keyboard 220 for requesting that an operation be performed and for controlling the portable subscriber unit 122, a conventional display 216 for reporting location information associated with the operation, and a conventional alert element 218 for alerting the user when an outbound message arrives. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a location information processing program 226 for programming the processing system 206 to cooperate with the controller 112 to process location information through well-known techniques. The memory 212 also includes a request typing program 228 for programming the processing system 206 to send a request type along with an inbound request in accordance with the present invention. The memory 212 also includes space for storing a location context 230, which can be identified to the portable subscriber unit 122 from a short-range cell or, alternatively, from the controller 112. It will be appreciated that, in an alternative embodiment, the location context 230 can reside in the base stations 116 or the controller 112, instead. The memory 212 further comprises a space for recording a speed 232 of the portable subscriber unit 122 currently calculated by the processing system 206 in cooperation with the location information processing program 226 and the controller 112. In one embodiment, the portable subscriber unit 122 also includes a location receiver 234, such as a Global Positioning System (GPS) receiver, coupled to the processing system 206 for helping determine the location of the portable subscriber unit 122 through well-known techniques. Operation of the portable subscriber unit 122 in accordance with the present invention will be described in detail further below.

Figure 3:
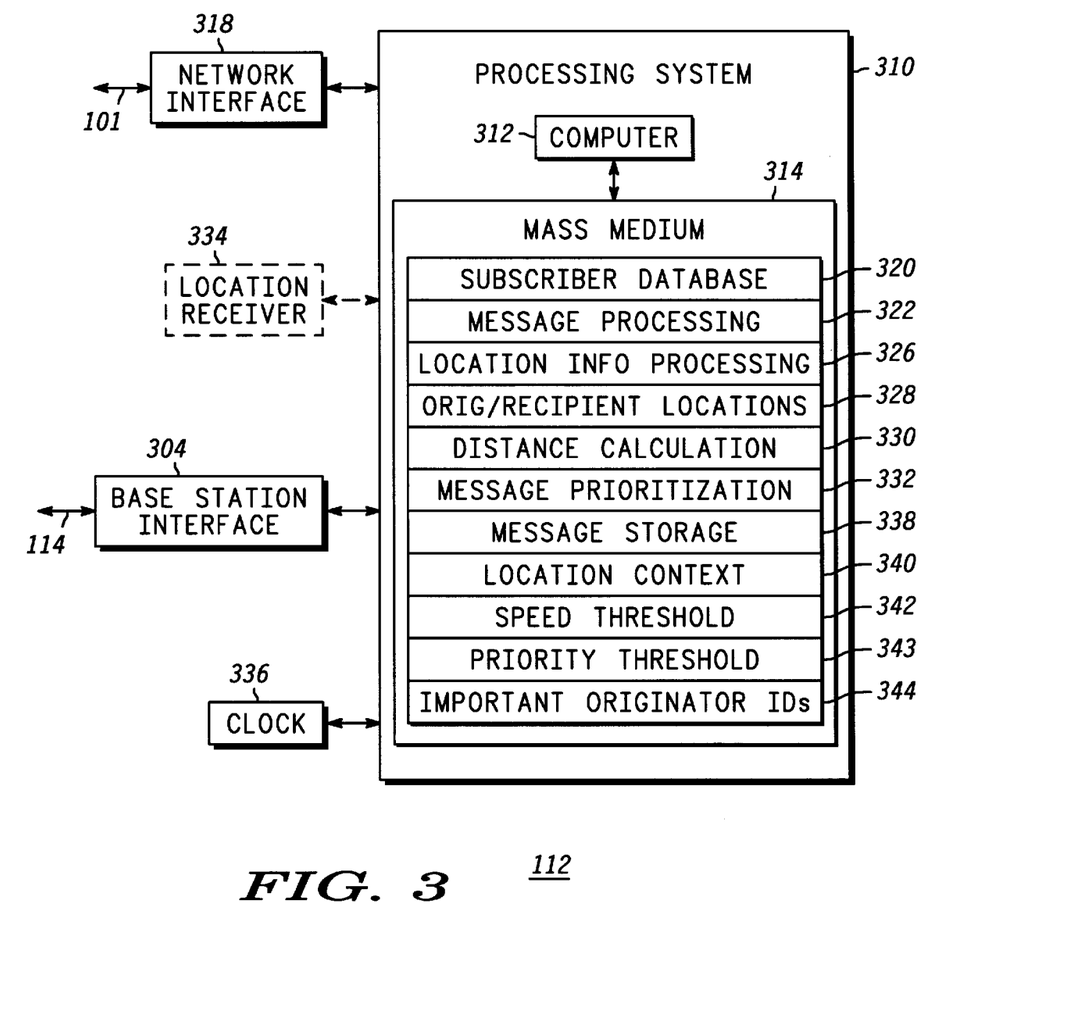
FIG. 3 is an electrical block diagram of an exemplary controller in accordance with the present invention.

FIG. 3 is an electrical block diagram depicting an exemplary controller 112 in accordance with the present invention, The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the portable subscriber units 122 via the base stations 116. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes a location information processing program 326 for programming the processing system 310 to cooperate with the portable subscriber unit 122 to process location information through well-known techniques. The mass medium 314 also includes space for storing originator and recipient locations 328 determined in response to communications handled by the wireless communication system. The mass medium 314 further comprises a distance calculation program 330 for programming the processing system 310 to calculate distances between corresponding pairs of the originator and recipient locations. In addition, the mass medium 314 includes a message prioritization program 332 for programming the processing system 310 to prioritize communications in accordance with the present invention. It will be appreciated that in an alternative embodiment, some or all of the functionality provided by the location information processing program 326, the distance calculation program 330, and the message prioritization program 332 can reside in the portable subscriber unit 122, instead.

The mass medium 314 further comprises a message storage space 338 for storing communications which do not have sufficient priority to be routed immediately to the portable subscriber unit 122. It will be appreciated that, alternatively, such messages can be routed to an external device, such as a voice mail system. In addition, the mass medium 314 comprises a location context database 340 for storing a plurality of locations and corresponding location contexts. A location context is descriptive of a characteristic of the location, e.g., safe, fire hazard, high crime, busy highway, etc. The mass medium 314 further comprises an area for storing at least one speed threshold 342 and at least one priority threshold 343 utilized in accordance with the present invention. In addition, the mass medium includes a list of important originator identifiers 344 defined by users of the plurality of portable subscriber units 122. It will be appreciated that, alternatively, some of the elements described above as being included in the mass medium 314 can instead be located on a server coupled to the wireless communication system via a network, such as the Internet, or can be included in the plurality of portable subscriber units 122. In one embodiment, the controller 112 also includes a location receiver 334, such as a GPS receiver, for helping determine the locations of the portable subscriber units 122 through well-known techniques. Operation of the controller 112 in accordance with the present invention will be described further below.

Figure 4:
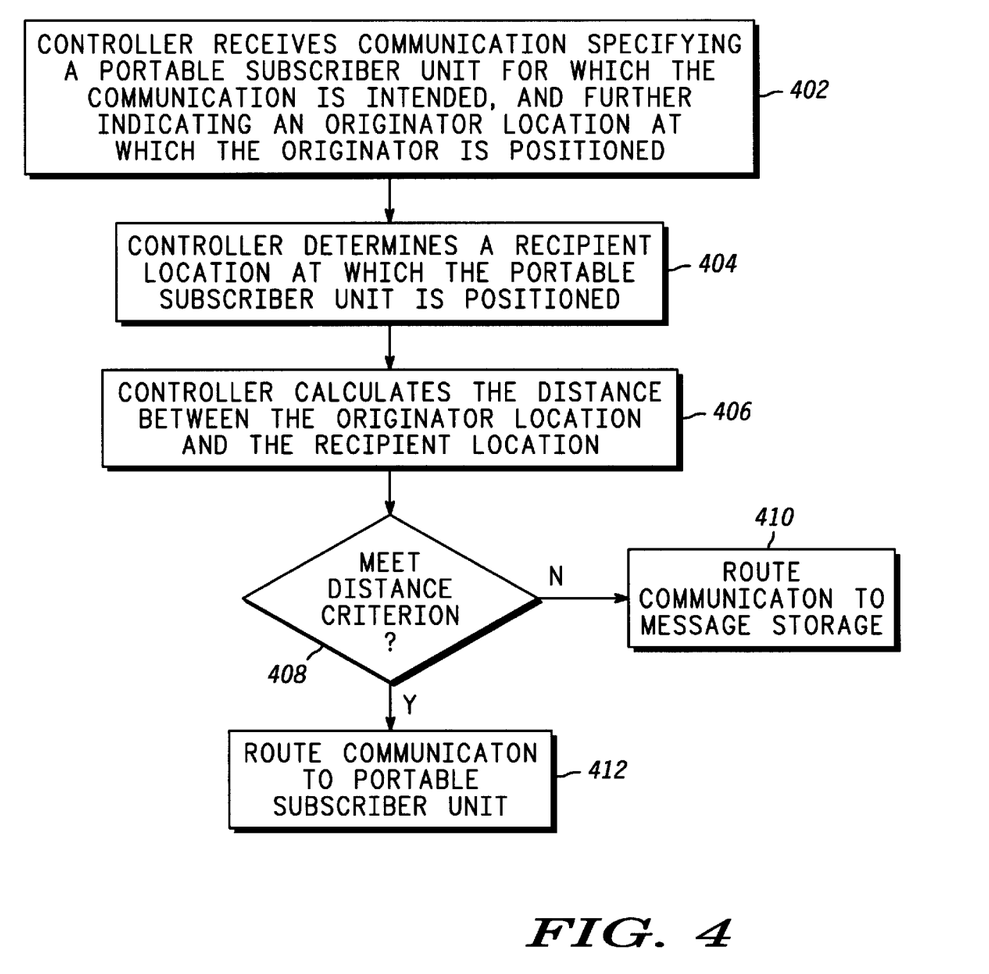
FIG. 4 is a flow diagram depicting operation of the exemplary wireless communication system in accordance with a first aspect of the present invention.

FIG. 4 is a flow diagram depicting operation of the exemplary wireless communication system in accordance with a first aspect of the present invention. The flow begins when the controller 112 receives 402 a communication specifying a portable subscriber unit 122 for which the communication is intended, and further indicating an originator location at which the originator of the communication is positioned. The controller 112 then cooperates with portable subscriber unit 122 for which the communication is intended to determine 404 a recipient location at which the portable subscriber unit 122 is positioned. The controller 112 then calculates 406 the distance between the originator location and the recipient location. The controller 112 checks 408 whether the distance meets a distance criterion, e.g., whether the distance is less than a predetermined distance, If so, the processing system 310 routes 412 the communication to the portable subscriber unit 122. If not, the processing system 310 routes 410 the communication elsewhere, e.g., to the message storage space 338. A practical example of an application of the first aspect of the present invention follows.

A salesman who covers a large territory is on the road for three weeks out of four. To get maximum value from visits to customers, the salesman puts a lot of effort on the 'current location' customers. This effort can be extended to messaging and/or phone services by the first aspect of the present invention, which can be arranged to direct calls and messages from customers in the same geographic area as the salesman directly to the salesman's portable subscriber unit and to redirect other calls to message storage (or voice mail). This is done to permit the salesman to communicate with the customers with whom he can visit directly, The originator locations of wireline-calling customers can be estimated, for example, through calling line identification (CLI) cross-referenced geographically by a database (not shown) of the mass medium 314.

Figure 5:
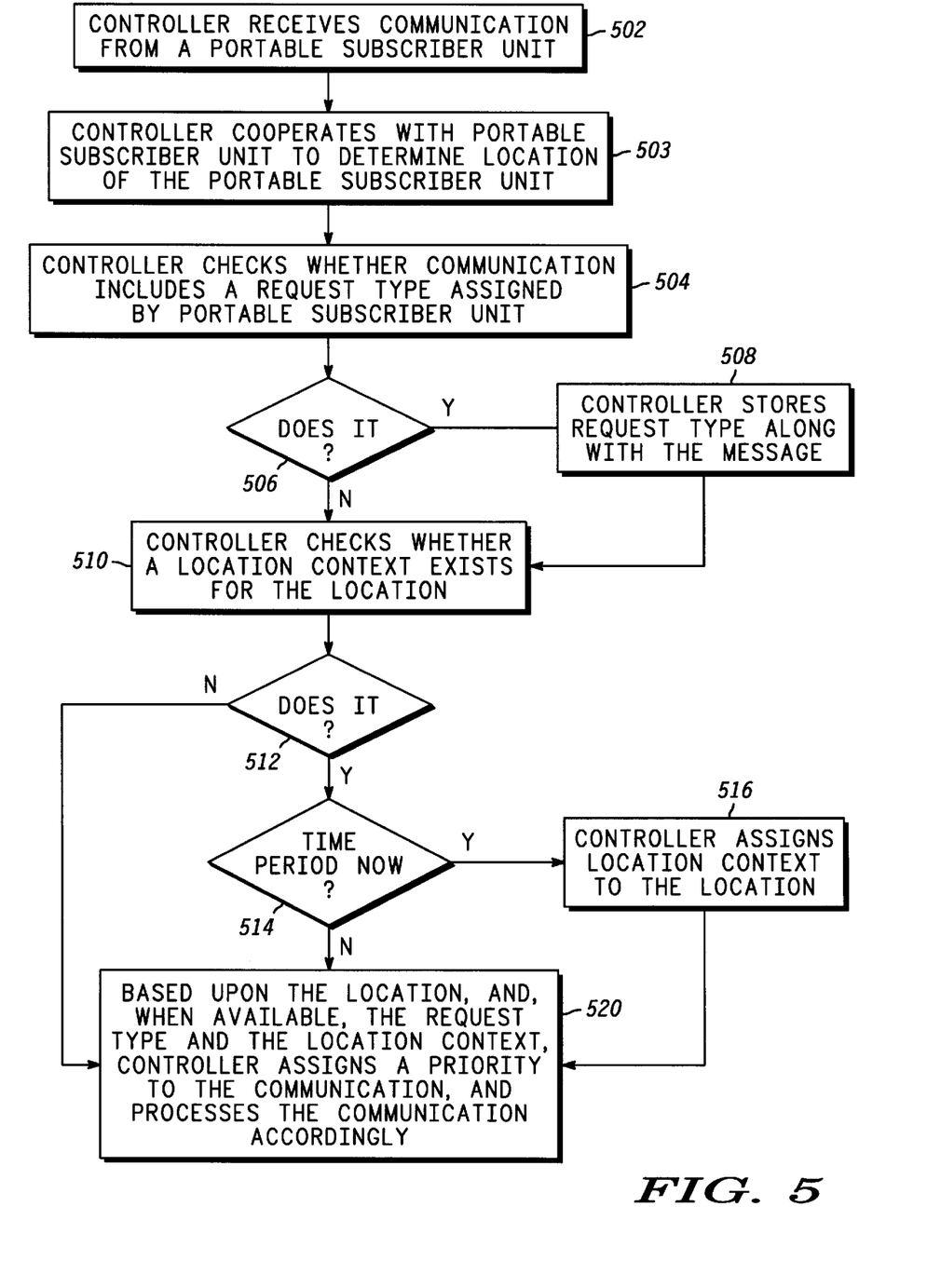
FIG. 5 is a flow diagram depicting operation of the exemplary wireless communication system in accordance with a second aspect of the present invention.

FIG. 5 is a flow diagram depicting operation of the exemplary wireless communication system in accordance with a second aspect of the present invention. Flow begins when the controller 112 receives 502 a communication from a portable subscriber unit 122. The controller 112 then cooperates 503 with the portable subscriber unit 122 to determine the location of the portable subscriber unit 122. The controller 112 also checks 504 whether the communication includes a request type assigned by the portable subscriber unit 122. The request type, e.g., normal, important, or emergency, preferably is assigned by the user through a key sequence. Alternatively, e.g., for an emergency-only device, the request type can be built into the portable subscriber unit 122. If the communication does include a request type, at step 506 the controller 112 decides to store 508 the request type along with the message, and then proceeds to step 510. If not, at step 506 the controller 112 proceeds directly to step 510 to check whether a location context exists in the location context database 340 corresponding to the location of the portable subscriber unit 122. If so, at step 512 the flow moves to step 514 where the controller 112 checks whether the location context applies at the current time. If so, the controller 112 assigns 516 the location context to the location. Then, based upon the location of the portable subscriber unit 122, and, when available, the request type and the location context, the controller assigns 520 a priority to the communication, and processes the communication in accordance with the priority. A practical example of an application of the second aspect of the present invention follows.

A child wearing the portable subscriber unit 122 has moved from a safe home location context to a safe playground location context. Queries and messages can have a lower priority in the system than those where the child is found to have moved to an unsafe location context, such as near a highway. In addition, a request type such as an emergengy call for help can be assigned a higher priority than, for example, a normal request type.

Another example, which is controlled by an applicable time period, follows. In the case of a natural disaster (earthquake, hurricane, etc,), communications originating from the disaster area can be given high priority over other areas for the duration of a time period lasting through an expected recovery time. For the case of a hurricane moving along the coast with a predictable path, the high priority areas can be set in advance and removed after the hurricane passes.

Figure 6:
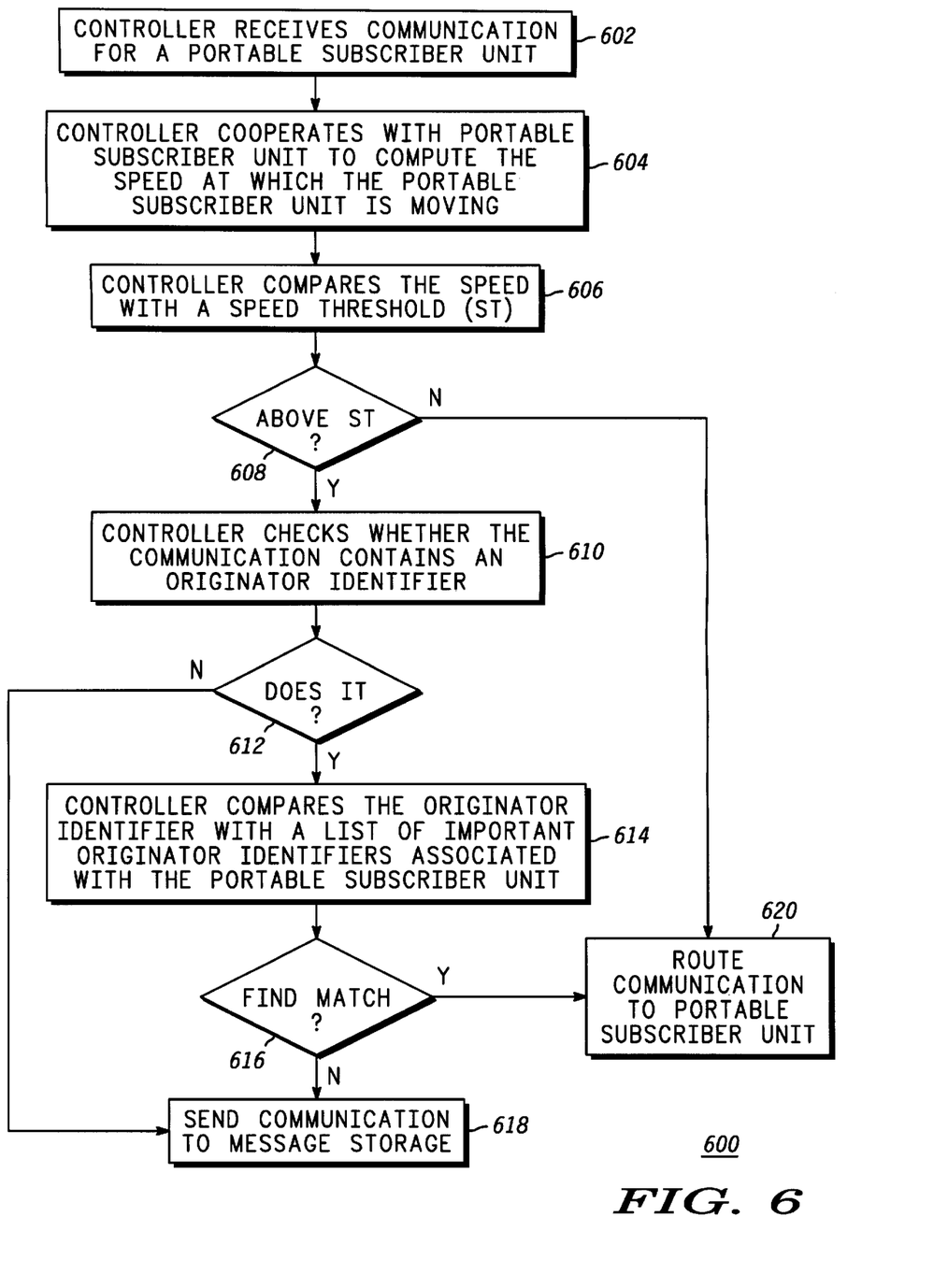
FIG. 6 is a flow diagram depicting operation of the exemplary wireless communication system in accordance with a third aspect of the present invention.

FIG. 6 is a flow diagram 600 depicting operation of the exemplary wireless communication system in accordance with a third aspect of the present invention. Flow begins with the controller 112 receiving 602 a communication intended for a portable subscriber unit 122. The controller 112 cooperates with the portable subscriber unit 122 to compute 604 the speed at which the portable subscriber unit 122 is moving, using well-known techniques. The controller 112 then compares 606 the speed with the speed threshold 342. If at step 608 the speed of the portable subscriber unit 122 is not above the speed threshold, then the controller 112 routes 620 the communication to the portable subscriber unit 122. If, on the other hand, at step 608 the speed is above the speed threshold, the controller checks 610 whether the communication contains an originator identifier, e.g., a selective call address, or a CLI. If at step 612 it does, the controller 112 compares 614 the originator identifier with the list of important originator identifiers 344 defined for the portable subscriber unit 122. If at step 616 the controller 112 has found an important originator identifier that matches the originator identifier, then the controller 112 routes 620 the communication to the portable subscriber unit 122. If not, the controller sends 618 the communication elsewhere, e.g., to the message storage space 338. Also, at step 612, when the communication does not contain an originator identifier, the flow proceeds to step 618. Preferably, the speed threshold 342 is assigned on a per-subscriber basis. Alternatively, a single, system-wide speed threshold can be utilized instead.

Figure 7:
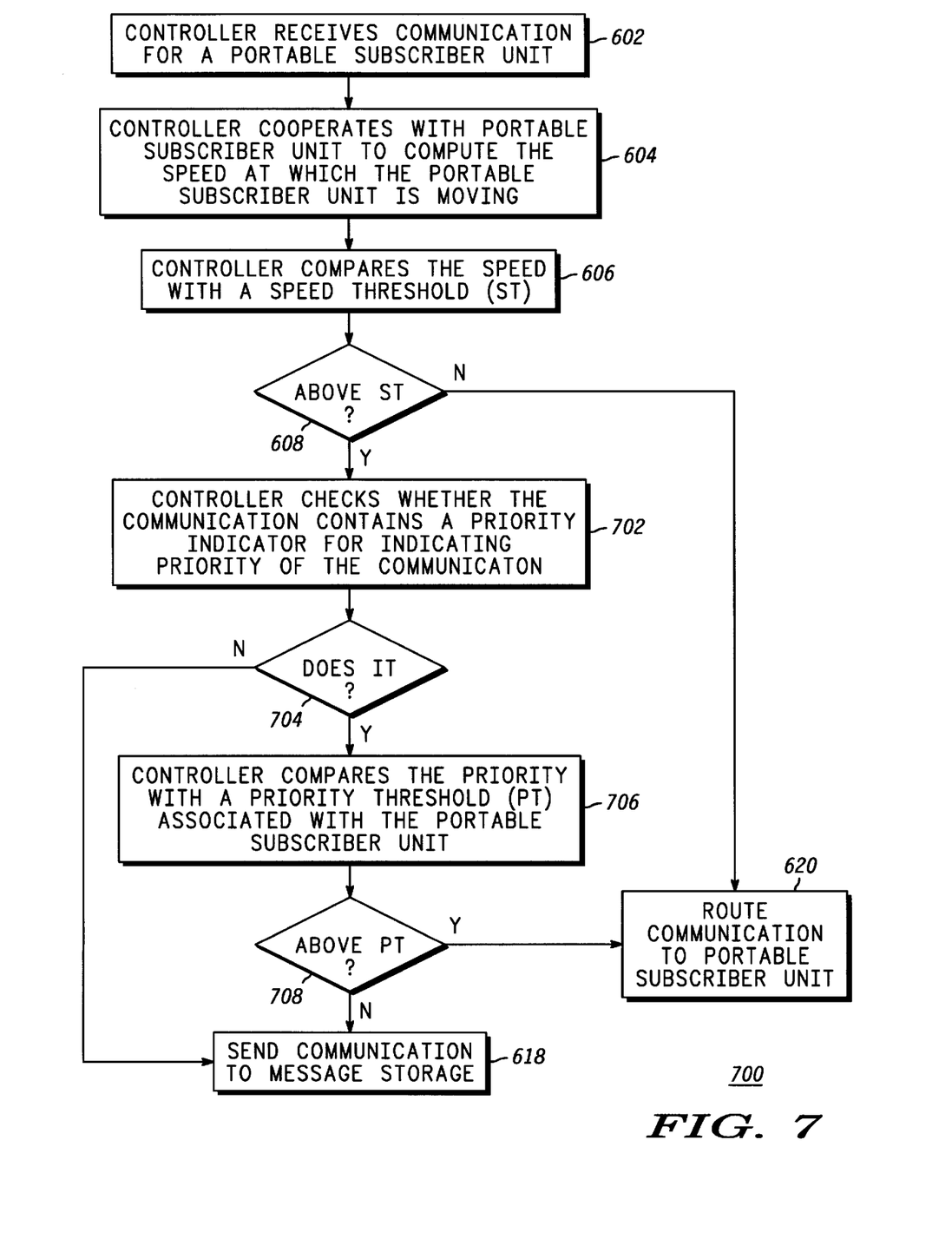
FIG. 7 is a flow diagram depicting operation of the exemplary wireless communication system in accordance with a fourth aspect of the present invention.

FIG. 7 is a flow diagram 700 depicting operation of the exemplary wireless communication system in accordance with a fourth aspect of the present invention. The flow diagram 700 is similar to the flow diagram 600, the essential differences being that when the speed of the portable subscriber unit 122 is above the speed threshold, the controller 112 checks 702 whether the communication contains a priority indicator for indicating the priority of the communication. If at step 704 it does, the controller 112 compares 706 the priority of the communication with the priority threshold 343 associated with the portable subscriber unit 122. Then at step 708 if the priority is above the priority threshold 343, the controller 112 routes 620 the communication to the portable subscriber unit 122, else the controller 112 sends 618 the communication elsewhere, e.g., to the message storage space 338. Preferably, the priority threshold 343 is assigned on a per-subscriber basis. Alternatively, a single, system-wide priority threshold can be utilized instead. Practical examples of applications of the third and fourth aspects of the present invention follow.

When a person is driving a car, the person wishes to limit the inbound calls to only a small sub-set of other individuals, e.g., wife and boss, since there is some concern for safety while talking and driving. The third aspect of the present invention advantageously provides such a feature.

Similarly, the fourth aspect allows a priority indicator attached to a call to be used to indicate whether the call is important enough to route to the called party even when driving in a car. It will be appreciated that the third and fourth aspects can be combined, such that, for example, only high priority calls from either the wife or the boss will be routed to the portable subscriber unit 122 when moving at high speed.

Thus, it should be clear from the preceding disclosure that the present invention advantageously provides a method for prioritizing a communication in a wireless communication system. Advantageously, the method allows prioritization of the communication based upon the relative locations of the caller and the intended recipient, further based upon the location of a calling portable unit, and further based upon the speed at which an intended portable recipient is moving.

Many modifications and variations of the present invention are possible in light of the above teachings. Thus, it is to be understood that, within the scope of the appended claims, the invention can be practiced of her than as specifically described herein above.

What is claimed is:

1. A method for prioritizing a communication in a wireless communication system serving a plurality of portable subscriber units, the method comprising the steps of:
    receiving said communication, which specifies a first one of the plurality of portable subscriber units for which said communication is intended, and further indicates an originator location at which an originator of said communication is positioned;
    determining a recipient location at which said first one of the plurality of portable subscriber units is positioned;
    calculating a distance between said originator location and said recipient location;
    routing said communication to said first one of the plurality of portable subscriber units when said distance meets a distance criterion;
    computing a speed at which said first one of the plurality of portable subscriber units is moving;
    comparing said speed with a speed threshold;
    comparing said originator with a list of important originators associated with said first one of the plurality of portable subscriber units, in response to said speed exceeding the speed threshold; and
    negating the routing step when said originator is not included in the list of important originators.

2. The method of claim 1,
    wherein said communication includes an indicator controlled by said originator for indicating a priority of said communication, and
    wherein the method further comprises the steps of:
        computing a speed at which said first one of the plurality of portable subscriber units is moving;
        comparing said speed with a speed threshold;
        comparing said priority with a priority threshold, in response to said speed exceeding the speed threshold; and
        negating the routing step when said priority is below the priority threshold.

3. The method of claim 1,
    wherein said communication originates from a second one of the plurality of portable subscriber units, and
    wherein the method further comprises the steps of:
        assigning a priority to said communication, the priority based upon said originator location; and
        processing said communication in accordance with said priority.

4. The method of claim 1, further comprising the step of sending said communication elsewhere when said distance does not meet the distance criterion.

5. A method for prioritizing a communication in a wireless communication system serving a plurality of portable subscriber units, the method comprising the steps of:
    receiving said communication from one of the plurality of portable subscriber units;
    determining a location at which the one of the plurality of portable subscriber units is positioned;
    assigning a location context to said location;
    designating a time period during which the location context is applicable;
    assigning a priority to said communication, the priority based upon said location and upon the location context only during said time period; and
    processing said communication in accordance with said priority.

6. The method of claim 5, wherein the location context is stored in at least one of:
    a fixed portion of the system; and the one of the plurality of portable subscriber units.

7. The method of claim 5, wherein the location context is identified to the one of the plurality of portable subscriber units from a short-range cell.

8. The method of claim 5, further comprising the step of defining a request type for said communication;

wherein the step of assigning the priority comprises the step of basing the priority upon the request type.

9. A method for prioritizing a communication including an originator identifier for identifying an originator of said communication in a wireless communication system serving a plurality of portable subscriber units, the method comprising the steps of:

receiving said communication, which specifies one of the plurality of portable subscriber units for which said communication is intended;

computing a speed at which said one of the plurality of portable subscriber units is moving;

comparing said speed with a speed threshold;

comparing said originator identifier with a list of important originator identifiers associated with said one of the plurality of portable subscriber units when said speed exceeds the speed threshold;

routing said communication to said one of the plurality of portable subscriber units when said speed does not exceed the speed threshold; and sending said communication to said one of the plurality of portable subscriber units when said originator identifier is included in the list of important originator identifiers.

10. The method of claim 9, wherein said communication includes a priority indicator controlled by an originator of said communication for indicating a priority of said communication, and wherein the method further comprises, before the routing step, the step of comparing said priority with a priority threshold, when said speed exceeds the speed threshold, and wherein the routing step comprises the step of routing said communication to said one of the plurality of portable subscriber units when said priority is above the priority threshold.

11. The method of claim 9, further comprising the step of sending said communication elsewhere when said speed exceeds the speed threshold.

* * * * *